(12) United States Patent
Faas

(10) Patent No.: US 10,436,327 B2
(45) Date of Patent: *Oct. 8, 2019

(54) BI-DIRECTIONAL SEAL ASSEMBLY FOR USE WITH VALVES

(71) Applicant: Fisher Controls International LLC, Marshalltown, IA (US)

(72) Inventor: Wayne Russell Faas, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/047,836

(22) Filed: Jul. 27, 2018

(65) Prior Publication Data

US 2018/0335144 A1 Nov. 22, 2018

Related U.S. Application Data

(63) Continuation of application No. 14/217,791, filed on Mar. 18, 2014, now Pat. No. 10,054,227, which is a
(Continued)

(51) Int. Cl.
*F16J 15/16* (2006.01)
*F16J 15/3236* (2016.01)
(Continued)

(52) U.S. Cl.
CPC ............ *F16J 15/16* (2013.01); *F16J 15/3236* (2013.01); *F16K 3/243* (2013.01); *F16K 47/08* (2013.01); *Y10T 137/86734* (2015.04)

(58) Field of Classification Search
CPC ........ F16J 15/3236; F16J 15/441; F16J 15/16; F16K 3/243; F16K 47/08; Y10T 137/86734

See application file for complete search history.

(56) References Cited

U.S. PATENT DOCUMENTS 2,187,257 A 1/1940 Williams
2,739,855 A 3/1956 Bruning
(Continued)

FOREIGN PATENT DOCUMENTS

CN 101910698 12/2010
CN 102422065 4/2012
(Continued)

OTHER PUBLICATIONS

Saint-Gobain Performance Plastics, "OmniSeal® 103A Face Seal," Product Bulletin for 103A Face Seal, retrieved from www.seals.saint-gobain.com on Mar. 6, 2009 (2 pages).
(Continued)

*Primary Examiner* — Eugene G Byrd
(74) *Attorney, Agent, or Firm* — Hanley, Flight & Zimmerman, LLC

(57) ABSTRACT

Bi-directional seal assemblies for use with valves are described. An example apparatus for use with a fluid valve includes a closure member disposed between an inlet and an outlet of a fluid flow passageway of the fluid valve. The closure member is to slide relative to a cage or a valve body, wherein the closure member includes a seal gland and a passageway in fluid communication with the seal gland, the passageway to fluidly couple the seal gland and the fluid flow passageway of the fluid valve. The apparatus further includes a seal assembly positioned in the seal gland, the seal assembly including a first seal, a second seal opposite the first seal, and a spacer ring disposed between the first and second seals.

20 Claims, 5 Drawing Sheets

Related U.S. Application Data continuation of application No. 12/430,978, filed on Apr. 28, 2009, now Pat. No. 8,714,560.

(51) Int. Cl.
*F16K 3/24* (2006.01)
*F16K 47/08* (2006.01)

(56) References Cited

U.S. PATENT DOCUMENTS

| | | | |
|---|---|---|---|
| 3,374,838 A | 3/1968 | Current | |
| 3,512,789 A | 5/1970 | Tanner | |
| 4,298,184 A | 11/1981 | Grunert et al. | |
| 4,572,519 A | 2/1986 | Cameron et al. | |
| 4,592,558 A | 6/1986 | Hopkins | |
| 4,618,154 A | 10/1986 | Freudenthal | |
| 4,706,970 A | 11/1987 | Ramirez | |
| 4,844,411 A | 7/1989 | Nelson | |
| 4,971,099 A | 11/1990 | Cyvas | |
| 5,085,443 A | 2/1992 | Richards | |
| 5,236,014 A | 8/1993 | Buls et al. | |
| 5,799,953 A | 9/1998 | Henderson | |
| 5,813,674 A | 9/1998 | Dickie et al. | |
| 5,860,680 A | 1/1999 | Drijver et al. | |
| 6,840,520 B2 | 1/2005 | Faas et al. | |
| 6,851,658 B2 | 2/2005 | Fitzgerald et al. | |
| 7,373,951 B2 | 5/2008 | Gossett et al. | |
| 7,448,409 B2 | 11/2008 | Micheel et al. | |
| 7,954,788 B2 | 6/2011 | Davies, Jr. et al. | |
| 3,251,373 A1 | 8/2012 | Lev et al. | |
| 8,714,560 B2 | 5/2014 | Faas | |
| 8,783,733 B2 | 7/2014 | Tausch | |
| 10,054,227 B2 * | 8/2018 | Faas | F16J 15/3236 |
| 2002/0017327 A1 | 2/2002 | Kawaai et al. | |
| 2003/0222410 A1 | 12/2003 | Williams et al. | |
| 2010/0052267 A1 | 3/2010 | Castleman et al. | |
| 2010/0270491 A1 | 10/2010 | Faas | |
| 2011/0260411 A1 | 10/2011 | Smith | |
| 2014/0197603 A1 | 7/2014 | Faas | |

FOREIGN PATENT DOCUMENTS

| | | |
|---|---|---|
| CN | 102449367 | 5/2012 |
| CN | 103097785 | 5/2013 |
| CN | 204647361 | 9/2015 |
| DE | 802488 | 2/1951 |
| WO | 9922164 | 5/1999 |
| WO | 2010126671 | 11/2010 |

OTHER PUBLICATIONS

Saint-Gobain Performance Plastics, "OmniSeal® 400A Series," Product Bulletin for 400A Series, retrieved from www.seals.saint-gobain.com on Mar. 6, 2009 (2 pages).

Saint-Gobain Performance Plastics, "How OmniSeals Work," Operation Instruction for OmniSeals, retrieved from www.seals.saint-gobain.com on Mar. 6, 2009 (1 page).

Saint-Gobain Performance Plastics, "Face Seal Hardware Design," Operation Instruction for OmniSeals, retrieved from www.seals.saint-gobain.com on Mar. 6, 2009 (1 page).

Saint-Gobain Performance Plastics, "Temperature, Pressure and Extrusion Gap," Operation Instruction for OmniSeals, retrieved from www.seals.saint-gobain.com on Mar. 6, 2009 (1 page).

Saint-Gobain Performance Plastics, "Friction and Rotary Motion," Operation Instruction for OmniSeals, retrieved from www.seals.saint-gobain.com on Mar. 6, 2009 (1 page).

Saint-Gobain Performance Plastics, "Seal Function and Motion," Operation Instruction for OmniSeals, retrieved from www.seals.saint-gobain.com on Mar. 6, 2009 (1 page).

Emerson Process Management, "easy-e® Cryogenic Sliding-Stem Control Valves," Product Bulletin for 51.1: easy-e Cyrogenic Valves, www.emersonprocess.com, Feb. 2007 (22 pages).

International Searching Authority, "International Search Report," issued in connection with international application serial No. PCT/US2010/029090, dated Aug. 5, 2010, 4 pages.

International Searching Authority, "Written Opinion of the International Searching Authority," issued in connection with international application serial No. PCT/US2010/029090, dated Aug. 5, 2010, 6 pages.

The United States Patent and Trademark Office, "Requirement for Restriction/Election," issued in connection with U.S. Appl. No. 12/430,978, dated Oct. 6, 2011, 8 pages.

The United States Patent and Trademark Office, "Non-Final Office Action," issued in connection with U.S. Appl. No. 12/430,978, dated Jan. 24, 2012, 14 pages.

The United States Patent and Trademark Office, "Final Office Action," issued in connection with U.S. Appl. No. 12/430,978, dated Jul. 9, 2012, 7 pages.

The United States Patent and Trademark Office, "Advisory Action," issued in connection with U.S. Appl. No. 12/430,978, dated Oct. 17, 2012, 3 pages.

The United States Patent and Trademark Office, "Non-Final Office Action," issued in connection with U.S. Appl. No. 12/430,978, dated Jan. 18, 2013, 7 pages.

The United States Patent and Trademark Office, "Final Office Action," issued in connection with U.S. Appl. No. 12/430,978, dated Aug. 30, 2013, 6 pages.

The United States Patent and Trademark Office, "Advisory Action," issued in connection with U.S. Appl. No. 12/430,978, dated Nov. 14, 2013, 4 pages.

The United States Patent and Trademark Office, "Notice of Allowance," issued in connection with U.S. Appl. No. 12/430,978, dated Dec. 19, 2013, 31 pages.

Patent Cooperation Treaty, "International Search Report," issued in connection with Application No. PCT/US2015/021140, dated Jun. 9, 2015, 5 pages.

Patent Cooperation Treaty, "Written Opinion," issued in connection with Application No. PCT/US2015/021140, dated Jun. 9, 2015, 5 pages.

State Intellectual Property Office (SIPO) of the People's Republic of China, "Notification of the First Office Action," issued in connection with Chinese Patent Application No. 201510117515.4, dated Apr. 2, 2018, 14 pages.

The United States Patent and Trademark Office, "Non-Final Office Action," issued in connection with U.S. Appl. No. 14/217,791, dated Nov. 12, 2015, 25 pages.

The United States Patent and Trademark Office, "Final Office Action," issued in connection with U.S. Appl. No. 14/217,791, dated Jun. 3, 2016, 13 pages.

The United States Patent and Trademark Office, "Advisory Action," issued in connection with U.S. Appl. No. 14/217,791, dated Sep. 9, 2016, 4 pages.

The United States Patent and Trademark Office, "Advisory Action," issued in connection with U.S. Appl. No. 14/217,791, dated Nov. 3, 2016, 5 pages.

The United States Patent and Trademark Office, "Non-Final Office Action," issued in connection with U.S. Appl. No. 14/217,791, dated Dec. 23, 2016, 13 pages.

The United States Patent and Trademark Office, "Non-Final Office Action," issued in connection with U.S. Appl. No. 14/217,791, dated Jun. 9, 2017, 11 pages.

The United States Patent and Trademark Office, "Final Office Action," issued in connection with U.S. Appl. No. 14/217,791, dated Oct. 16, 2017, 10 pages.

The United States Patent and Trademark Office, "Notice of Allowance," issued in connection with U.S. Appl. No. 14/217,791, dated Apr. 18, 2018, 15 pages.

* cited by examiner

BI-DIRECTIONAL SEAL ASSEMBLY FOR USE WITH VALVES

RELATED APPLICATIONS

This patent application arises from a continuation of U.S. patent application Ser. No. 14/217,791, entitled "BI-DIRECTIONAL SEAL ASSEMBLY FOR USE WITH VALVES," filed on Mar. 18, 2014, now U.S. Pat. No. 10/054,227, which claims the benefit of U.S. patent application Ser. No. 12/430,978, entitled "BI-DIRECTIONAL SEAL ASSEMBLY FOR USE WITH VALVES," and filed on Apr. 28, 2009, now U.S. Pat. No. 8,714,560. Priority to U.S. patent application Ser. No. 14/217,791 and U.S. patent application Ser. No. 12/430,978 is claimed. U.S. patent application Ser. No. 14/217,791 and U.S. patent application Ser. No. 12/430,978 are hereby incorporated by reference in their respective entireties.

FIELD OF THE DISCLOSURE

This disclosure relates generally to fluid valves and, more particularly, to bidirectional seal assemblies for use with valves.

BACKGROUND

Valves are commonly used in process control systems to control the flow of process fluids. Sliding stem valves (e.g., a gate valve, a globe valve, a diaphragm valve, a pinch valve, etc.) typically have a closure member (e.g., a valve plug) disposed in a fluid path. A valve stem operatively couples the closure member to an actuator that moves the closure member between an open position and a closed position to allow or restrict the flow of fluid between an inlet and an outlet of the valve. Additionally, to provide a desired and/or to achieve certain flow characteristics of the fluid, valves often employ a cage that interposes in the path of fluid between the inlet and the outlet of the valve. A cage can reduce capacity flow, attenuate noise, and/or reduce or eliminate cavitation. Additionally, a cage surrounds the closure member to provide stability, balance, and alignment to the closure member.

To effect a seal between a cage and a closure member, the closure member typically includes a channel or groove that receives a seal and/or piston ring that engages an inner surface of the cage. Typically, the size of the valve, industrial process conditions such as pressure conditions and operational temperatures (e.g., temperatures between −100° F. and 450° F., temperatures greater than 450° F. with the use of an anti-extrusion ring, etc.) of the process fluids are used to determine the type of valve and valve components that may be used such as, for example, the types of seals that may be used to effect a seal between a cage and a closure member. For example, a valve having a process fluid that experiences a relatively high pressure differential across its flow passageway typically employs a pressure-balanced closure member to minimize or reduce the thrust or force to be exerted by an actuator to move the closure member to a closed position. Additionally, valves having larger sized ports or flow passageways (e.g., greater than 1 inch in diameter) may employ spring-loaded seals to provide a tighter seal. Typically, a bidirectional seal assembly is often employed with pressure-balanced closure members to provide bidirectional sealing between the cage and closure member to minimize or eliminate leakage in forward and reverse fluid flow applications.

Some known bidirectional sealing assemblies include spacer rings to maintain opposing seals separated or spaced apart from each other. The spacer rings are often sized to provide a clearance between the spacer ring (e.g., an outside diameter of the spacer ring) and a surface of the cage (e.g., an inner surface of the cage). However, due to wear, manufacturing tolerances, etc., the spacer ring may engage or contact the surface of the cage as the valve plug moves between an open position and a closed position, thereby increasing friction between the closure member or the seal assembly and the cage. While spacer rings made of metal material can be used to prevent excessive or rapid wear of the spacer rings, such metal spacer rings may mare or damage the cage surface, thereby causing unwanted leakage and reducing the life of the cage.

SUMMARY

An example apparatus for use with a fluid valve includes a closure member disposed between an inlet and an outlet of a fluid flow passageway of the fluid valve. The closure member is to slide relative to a cage or a valve body, wherein the closure member includes a seal gland and a passageway in fluid communication with the seal gland, the passageway to fluidly couple the seal gland and the fluid flow passageway of the fluid valve. The apparatus further includes a seal assembly positioned in the seal gland, the seal assembly including a first seal, a second seal opposite the first seal, and a spacer ring disposed between the first and second seals.

Another example apparatus for use with a fluid valve includes a valve plug disposed between an inlet and an outlet in a fluid flow passageway of the fluid valve, the valve plug movable relative to a valve seat to control fluid flow through the fluid flow passageway and including a channel to fluidly couple to the fluid flow passageway, wherein a passageway in the valve plug fluidly couples a seal gland to the channel when the valve plug engages the valve seat and a seal assembly disposed in the seal gland.

Another apparatus for use with a fluid valve includes a closure member to slide relative to a cage or a valve body, the closure member having a seal gland adjacent a shoulder of the closure member, wherein the closure member includes a channel to fluidly couple a first side of the closure member associated with a fluid flow passageway of the fluid valve and a second side of the closure member associated with a cavity to equalize pressure between the first and second sides of the closure member. The apparatus further includes a seal assembly disposed on the shoulder of the closure member, the seal assembly including a first seal and a second seal opposite the first seal, the first and second seals to sealingly engage the closure member and the cage or the valve body opposite the closure member, a spacer ring disposed between the first and second seals to prevent the first and second seals from contacting each other, and a retaining ring to retain the seal assembly between the retaining ring and the shoulder of the closure member.

DETAILED DESCRIPTION

The example seal assemblies described herein may be used with valves having a sliding stem such as, for example, control valves, throttling valves, etc., which may include a valve trim arrangement (e.g., a cage). In general, the example seal assemblies described herein effect a seal to substantially prevent leakage between a sealing surface or a cage and a closure member (e.g., a valve plug) of a valve. In particular, an example seal assembly described herein includes a first seal and a second seal opposite the first seal where both seals are disposed between an outer surface of the closure member and an inner surface of the cage. A spacer ring is disposed between the first and second seals to prevent the first and second seals from contacting each other when the pressure of the process fluid is insufficient to assist the seals to seal against a sealing surface (e.g., the inner surface of the cage and the outer surface of the closure member). More specifically, the spacer ring is at least partially disposed within cavities of the first and second seals and is sized (e.g., has a width or is dimensioned) to fit within outer surfaces of the first and second seals so that the spacer ring does not engage or contact the outer surface of the closure member and/or the inner surface of the cage. The spacer ring may be made of a thermoplastic material, a polymer, a metal, or any other material(s).

Figure 1:
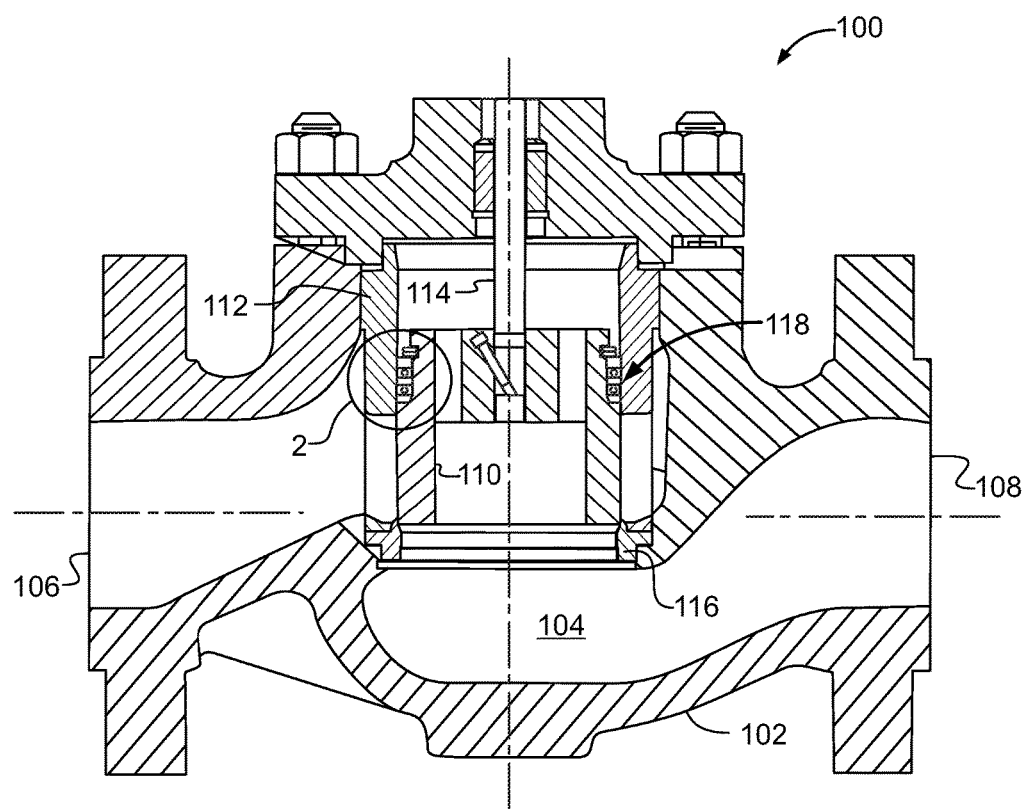
FIG. 1 is a cross-sectional view of a portion of a known valve implemented with a known sealing assembly.

FIG. 1 illustrates a cross-sectional view of a portion of a known valve 100. The valve 100 illustrated in FIG. 1 includes a valve body 102 that defines a fluid flow passageway 104 between an inlet 106 and an outlet 108. A valve plug 110 is slidably disposed within a cage 112 and moves between an open position and a closed position to control the fluid flow rate through the valve 100. A valve stem 114 couples the valve plug 110 to an actuator (not shown), which moves the valve plug 110 toward and away from a valve seat 116. In operation, the actuator moves the valve plug 110 away from the valve seat 116 to allow fluid flow through the valve 100 (e.g., the open position) and toward the valve seat 116 to restrict fluid flow through the valve 100. The valve plug 110 sealingly engages the valve seat 116 to prevent fluid flow through the valve 100 (e.g., the closed position). A seal assembly 118 prevents fluid leakage between the valve plug 110 and the cage 112 when the valve 100 is in the closed position (i.e., when the valve plug 110 sealingly engages the valve seat 116) as shown in FIG. 1.

Figure 2:
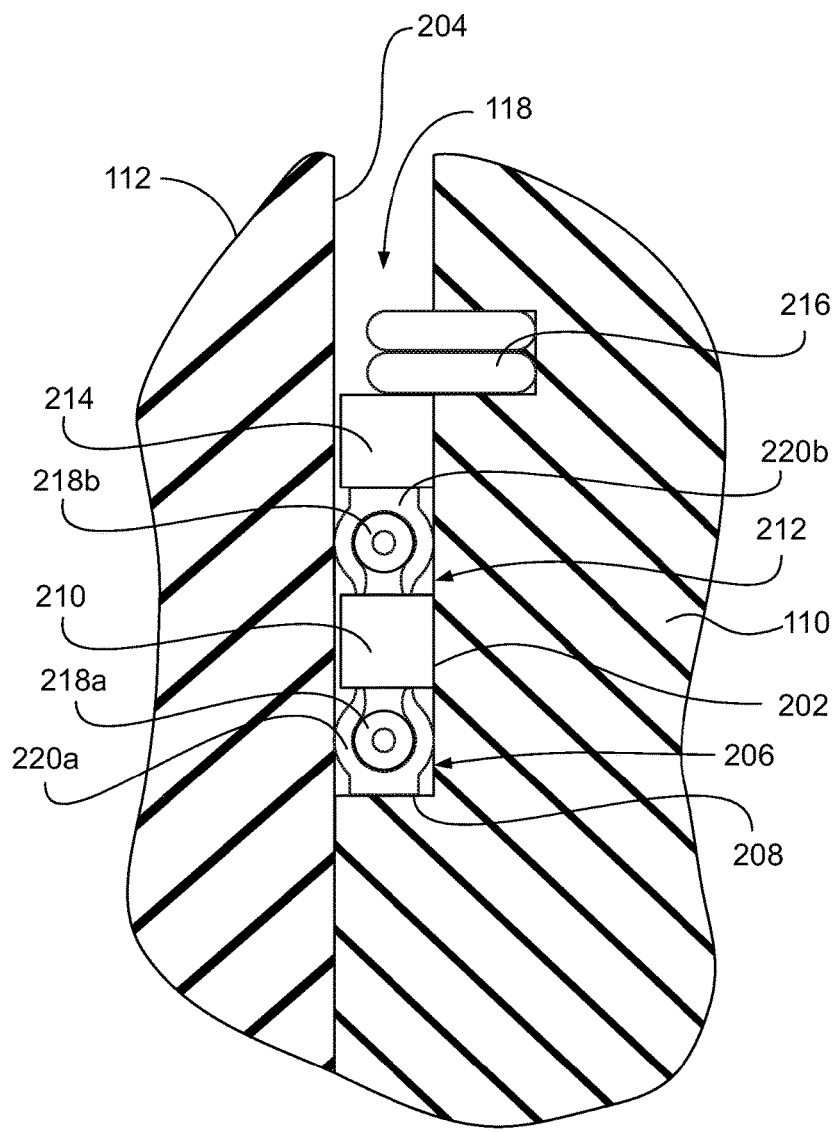
FIG. 2 is an enlarged portion of the example valve of FIG. 1.

FIG. 2 depicts an enlarged portion of the valve plug 110, the cage 112, and the seal assembly 118 of FIG. 1. The valve plug 110 includes a recessed portion 202 to receive the seal assembly 118. The seal assembly 118 engages an inner surface 204 of the cage 112 to prevent fluid from leaking between the cage 112 and the valve plug 110 when the valve 100 is in the closed position. The seal assembly 118 includes a first spring-loaded seal 206 disposed between a shoulder 208 of the valve plug 110 and a first spacer ring 210, and a second spring-loaded seal 212 disposed between the first spacer ring 210 and a second spacer ring 214. The seal assembly 118 also includes a retaining ring 216 to retain or hold the seal assembly 118 together.

The first and second spring-loaded seals 206 and 212 include springs 218a and 218b disposed within respective outer jackets or coverings 220a and 220b. The springs 218a and 218b are typically helically-shaped springs. The spacer rings 210 and 214 prevent the first spring-loaded seal 206 from contacting the second spring-loaded seal 212 as the valve plug 110 moves relative to the cage 112. Additionally, the spacer rings 210 and 214 retain the spring-loaded seals 206 and 212 to prevent the spring-loaded seals 206 and 212 from becoming dislodged or trapped between the cage 112 and the valve plug 110, thereby preventing impairment of the operation of the seals 206 and 212, the cage 112, or the valve plug 110. The spacer rings 210 and 214 are made of a metallic material to prevent excessive wear to the rings 210 and 214 if, for example, the seals 206 and/or 212 wear such that the spacer rings 210 and/or 214 engage or contact the surface of the cage as the valve plug moves between an open position and a closed position. While spacer rings made of metallic materials can be used to prevent excessive or rapid wear of the spacer rings, such metal spacer rings may mare or damage the cage surface, thereby causing unwanted leakage and reducing the life of the cage.

Figure 3:
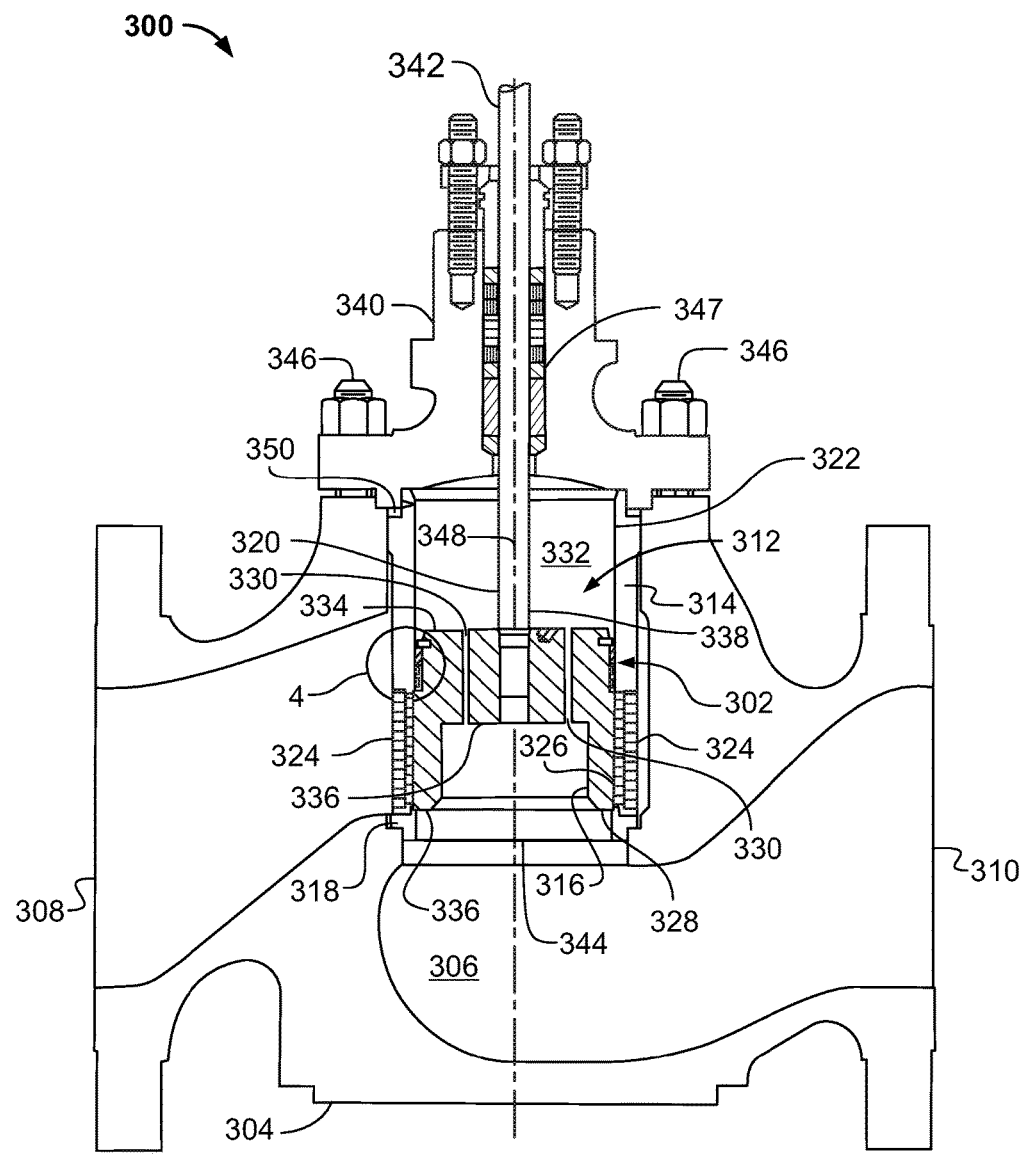
FIG. 3 is a cross-sectional view of a portion of a valve implemented with an example seal assembly described herein.

FIG. 3 illustrates a cross-sectional view of a valve 300 implemented with an example bidirectional seal assembly 302 described herein. The valve 300 illustrated in FIG. 3 includes a valve body 304 that defines a fluid flow passageway 306 between a first port or inlet 308 and a second port or outlet 310. In other examples, because the example seal assembly 302 provides a bidirectional seal, the direction of fluid flowing through the valve may be reversed such that the second port 310 is an inlet port and the first port 308 is an outlet port.

A valve trim assembly 312 interposes in the fluid flow passageway 306 to control fluid flow between the inlet 308 and the outlet 310. The valve trim assembly 312 includes internal components of the valve 300 such as, for example, a cage 314, a closure member 316 (e.g., a valve plug), a valve seat 318 (e.g., a seat ring), and a valve stem 320.

The cage 314 is disposed between the inlet 308 and the outlet 310 to provide certain fluid flow characteristics through the valve body 304 (e.g., reduce noise and/or cavitation generated by the flow of fluid through the valve 300). The cage 314 includes a bore 322 to receive (e.g., slidably receive) the closure member 316 and at least one opening 324 through which fluid can flow when the valve 300 is in an open position (i.e., when the closure member 316 is spaced away from the valve seat 318). A cage can be configured in different manners to provide certain fluid flow characteristics to suit the needs of a particular control application. For example, the openings 324 may be designed or configured to provide particular, desirable fluid flow characteristics of the fluid such as, for example, to reduce noise and/or cavitation, to enhance pressure reductions of the process fluid, etc. The desired fluid flow characteristics are achieved by varying the geometry of the openings 324. In some example implementations, the cage 314 may include a plurality of openings having various shapes, sizes, and/or spacing(s) to control the flow, reduce cavitation, and/or reduce noise through the valve.

The cage 314 guides the closure member 316 and provides lateral stability as the closure member 316 travels between the open position and a closed position, thereby reducing vibrations and other mechanical stress. The cage 314 can also facilitate maintenance, removal, and/or replacement of the other components of the valve trim assembly 312. In the illustrated example, the cage 314 is a substantially unitary structure. However, in other example implementations, the cage 314 can be a two-piece structure that includes an upper portion that removably couples to a lower portion. In yet other examples, a retainer (not shown) may be used to retain the cage 314 within the valve body 304.

The closure member 316 has an outer surface 326 sized to closely fit within the cage 314 so that the closure member 316 can slide within the bore 322 of the cage 314. The closure member 316 can slide within the cage 314 between the closed position, in which the closure member 316 obstructs the openings 324 of the cage 314, and the open position, in which the closure member 316 is clear of (i.e., does not block) at least a portion of the openings 324. In the illustrated example, the closure member 316 is depicted as a valve plug having a cylindrical body and a seating surface 328. However, in other examples, the closure member 316 may be a disk or any other structure to vary the flow of fluid through a valve.

In this example, the closure member 316 includes channels or conduits 330 to balance the pressures acting across the closure member 316. In this manner, the forces exerted across the closure member 316 by the pressure of the process fluid flowing through the valve 300 are substantially equalized. For example, the pressure of the fluid in the cavity 332 exerts a force on a first side or surface 334 of the closure member 316 that is approximately equal to and opposite a force exerted on a second side or surface 336 of the closure member 316. As a result, a smaller actuating force can be provided to move the closure member 316 between the open and closed positions.

The valve stem 320 is operatively coupled to the closure member 316 at a first end 338 and extends through a bonnet 340 to couple the closure member 316 to an actuator stem (not shown) at a second end 342. The actuator stem couples the closure member 316 to an actuator (not shown). The actuator (e.g., a pneumatic actuator) drives the valve stem 320 and, thus, the closure member 316 between the closed position at which the closure member 316 is in sealing engagement with the valve seat 318 (e.g., a seat ring) to restrict or prevent fluid flow through the valve 300 and the fully open or maximum flow rate position at which the closure member 316 is spaced away from the valve seat 318 to allow fluid flow through the valve 300. In the open position, fluid flows between the inlet 308, through the openings 324 of the cage and an opening 344 of the valve seat 318 and through the outlet 310. In the closed position, the closure member 316 covers the openings 324 of the cage 314 and sealingly engages the valve seat 318 via the sealing surface 328 to prevent fluid flow between the inlet 308 and the outlet 310.

The bonnet 340 is coupled to the valve body 304 via fasteners 346, and the bonnet 340 couples the valve body 304 to the actuator (not shown). The bonnet 340 houses a packing system 347 (e.g., a spring packing), which prevents undesired leakage to the environment via the valve stem 320 as the valve stem 320 moves or slides within the valve 300 along an axis 348. The bonnet 340 also includes a gasket 350 to prevent unwanted fluid leakage through the valve body 304. In this example, the bonnet 340 is fixed to the valve body 304 to retain (e.g., via an interference and/or press fit) the cage 314 and the valve seat 318 within the valve body 304. In other examples, the valve seat 318 couples to the cage 314 and/or the valve body 304 via, for example, fasteners, etc.

Figure 4:
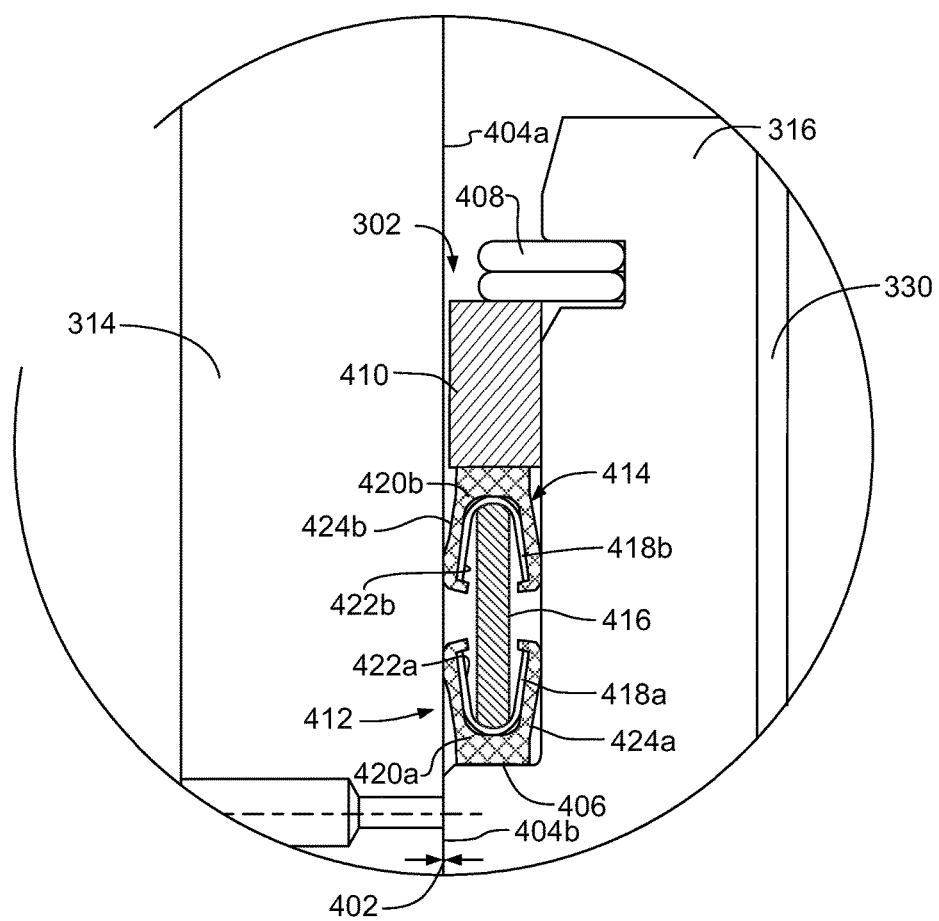
FIG. 4 is an enlarged portion of the example valve of FIG. 3.

Referring also to FIG. 4, although the closure member 316 closely fits within the bore 322 of the cage 314, a gap 402 is formed between the closure member 316 and the cage 314. Fluid may leak through the gap 402. For example, when the valve 300 is in the closed position, fluid from the inlet 308 may flow via the gap 402 through the conduits 330 of the closure member 316, and through the outlet 310 of the valve 300. Such unwanted leakage affects the shut-off classification of the valve 300. For example, the American National Standards Institute has established various leakage classifications (e.g., Class I, II, III, etc.) relating to the amount of fluid flow allowed to pass through a valve when the valve is in a closed position. The seal assembly 302 is disposed between the cage 314 and the closure member 316 to prevent leakage between the inlet 308 and the outlet 310 of the valve 300 when the closure member 316 is in the closed position to improve the shut-off classification of the valve 300.

The example seal assembly 302 prevents unwanted leakage through the gap 402 when the closure member 316 is in the closed position. Thus, the seal assembly 302 effects a seal between a first sealing surface 404a (e.g., an inner surface of the cage 314) and a second sealing surface 404b (e.g., the outer surface 326 of the closure member 316). The closure member 316 includes a shoulder 406 to receive the seal assembly 302. A retaining or snap ring 408 retains the seal assembly 302 between the retaining ring 408 and the shoulder 406 of the closure member 316. A back-up ring 410 may be disposed between the retaining ring 408 and the seal assembly 302 to maintain the position and/or orientation of the seal assembly 302 relative to the closure member 316. Additionally or alternatively, although not shown, the seal assembly 302 may include an anti-extrusion ring (e.g., disposed adjacent the shoulder 406 and/or the back-up ring 410) to prevent the seal assembly 302 from extruding into the gap 402 as the closure member 316 moves between the open position and the closed position.

The seal assembly 302 includes a first seal 412, a second seal 414, and a spacer ring 416. In this example, the first seal 412 is substantially similar or identical to the second seal 414. Each of the first and second seals 412 and 414 is implemented as a spring-loaded seal. The seals 412 and 414 include respective springs 418a and 418b disposed within respective outer jackets 420a and 420b. The springs 418a and 418b include a ring-shaped cantilevered finger spring and have a V-shaped (or U-shaped) cross-sectional shape. The springs 418a and 418b may be made of, for example, stainless steel, or any other suitable material. The jackets 420a and 420b are also in the form of a ring and can be unitary or partially ring-shaped. The jackets 420a and 420b include respective cavities or channels 422a and 422b to receive the springs 418a and 418b. The jackets 420a and 420b may be made of a flexible material that does not generate excessive friction between the closure member 316 and the cage 314. For example, the jackets 420a and 420b may be made of a fluoropolymer material (e.g., Teflon®), an elastomeric material, or any other suitable material. When disposed within the respective channels 422a and 422b, the springs 418a and 418b provide a load to assist or bias outer surfaces 424a and 424b of the outer jackets 420a and 420b against the first sealing surface 404a and the second sealing surface 404b. In other examples, the first seal 412 may be different from the second seal 414. For example, the jacket 420a of the first seal 412 may be made of a material that is different from the material of the jacket 420b of the second seal 414.

The first seal 412 is disposed between the closure member 316 and the cage 314 in an opposite direction or orientation relative to the second seal 414. In particular, as depicted in this example, the channel 422a of the first seal 412 faces the channel 422b of the second seal 414. In this manner, the first and second seals 412 and 414 provide a bidirectional seal to prevent leakage between the closure member 316 and the cage 314 regardless of the direction of fluid flow through the valve 300.

The spacer ring 416 is at least partially disposed within the channels 422a and 422b of the respective first and second seals 412 and 414. The spacer ring 416 prevents the first and second seals 412 and 414 from contacting each other when the pressure of the fluid in the flow passageway 306 is insufficient to pressure-assist or hold the first and second seals 412 and 414 in spaced apart relation relative to each other. Additionally, the spacer ring 416 is sized to fit within the outer surfaces 424a and 424b of the jackets 420a and 420b. In this manner, the spacer ring 416 is sized so that it does not engage or contact the first sealing surface 404a (i.e., the inner surface or bore 322 of the cage 314) and/or the second sealing surface 404b. As a result, the spacer ring 416 may be made of, for example, a thermoplastic material such as, for example, polyetheretherketone (PEEK), a metal, or any other suitable materials and/or materials that can withstand fluids having relatively high temperatures (e.g., fluid temperatures above 450° F., greater than 450° F. with the use of an anti-extrusion ring, etc.).

Also, for example, should the seal assembly 302 (e.g., the outer surfaces 424a and/or 424b) wear, the spacer ring 416 will not engage or slide against the cage 314 (i.e., the first sealing surface 404a), thereby substantially reducing seal friction between the closure member 316 and the cage 314. In general, the seal assembly 302 substantially increases the life of the seal ring 416 because the seal ring 416 does not engage the cage 314 or the closure member 316.

Referring to FIGS. 3 and 4, in operation, an actuator (e.g., a pneumatic actuator) drives the closure member 316 between the fully open or maximum flow rate position at which the seating surface 328 of the closure member 316 is spaced away from the valve seat 318 to allow the flow of fluid through the valve 300 and a closed position. The seal assembly 302 moves or slides in a direction along the axis 348 as the closure member 316 moves between the open position and the closed position. At the closed position, the closure member 316 sealingly engages the valve seat 318 and blocks the openings 324 of the cage 314 to prevent fluid flow through the valve 300 between the inlet 308 and the outlet 310.

When the valve 300 is in the closed position, fluid may flow into the gap 402 between the closure member 316 and the cage 314. The seal assembly 302 described herein prevents the fluid from traveling further and, thus, prevents the fluid from leaking between the cage 314 and closure member 316.

The outer jackets 420a and 420b of the first and second seals 412 and 414 engage the sealing surfaces 404a and 404b. The springs 418a and 418b apply a load against the jackets 420a and 420b to bias the outer surfaces 424a and 424b of the jackets 420a and 420b against the sealing surfaces 404a and 404b, thereby effecting a tight seal and preventing undesired fluid leakage between the cage 314 and the closure member 316. For example, fluid attempting to leak through the valve 300 between the closure member 316 and the cage 314 from the inlet 308 presses against an inner surface 422b of the jacket 420b, thereby pressure-assisting the outer surface 424b against the sealing surfaces 404a and 404b. Conversely, if the direction of flow is reversed, fluid attempting to leak through the valve 300 between the closure member 316 and the cage 314 that is flowing through the conduits 330 of the closure member 316 presses against an inner surface 422a of the jacket 420a, thereby pressure-assisting the outer surface 424a of the jacket 420a against the sealing surfaces 404a and 404b. This action improves the seal (e.g., provides a tighter seal) between the closure member 316 and the cage 314.

Additionally or alternatively, because the springs 418a and 418b exert a force to bias the respective jackets 420a and 420b toward the sealing surfaces 404a and 404b, the spring-loaded seals 412 and 414 enable a relatively relaxed tolerance in machining and assembly of the valve components and/or dimensional variations caused by temperature changes.

In operation, the spacer ring 416 maintains or keeps the first and second seals 412 and 414 in spaced apart relation and prevents the first and second seals 412 and 414 from contacting each other. Failing to maintain the first and second seals 412 and 414 in spaced apart relation may otherwise cause the first and second seals 412 and 414 to become jammed or stuck within the gap 402 between the cage 314 and the closure member 316, thereby resulting in an ineffective seal.

Figure 5:
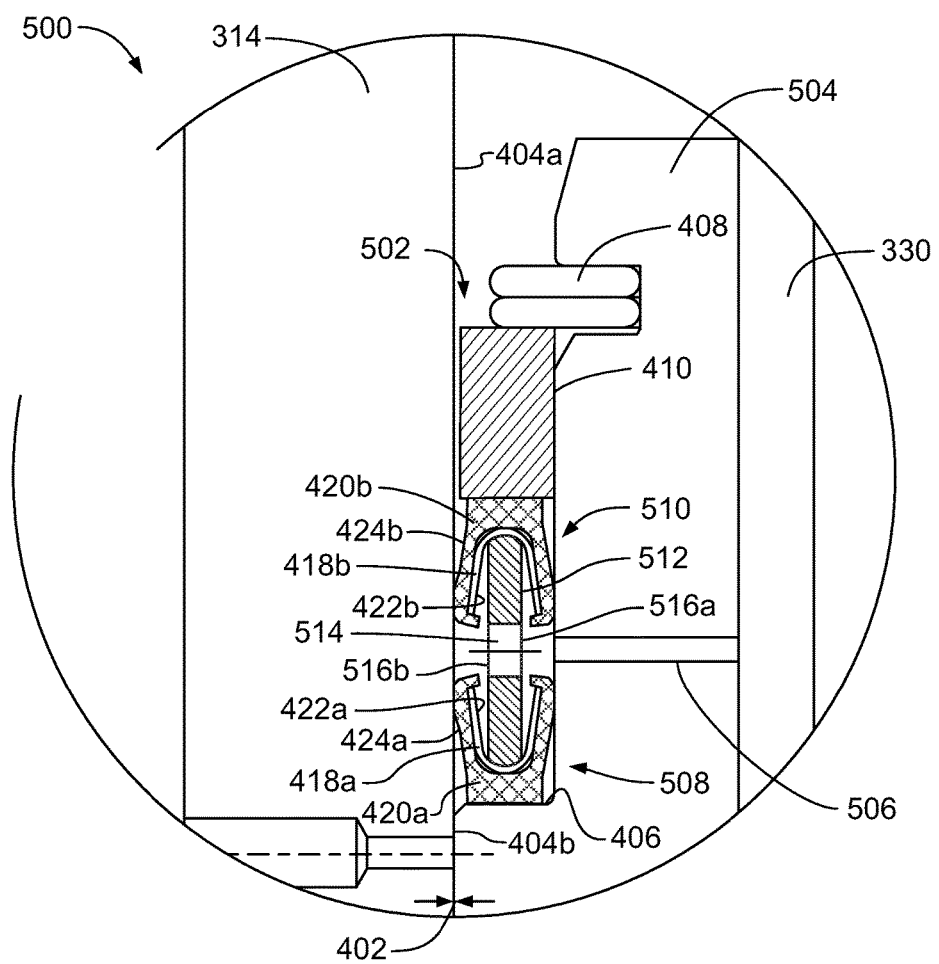
FIG. 5 illustrates an enlarged portion of a valve implemented with another example seal assembly described herein.

FIG. 5 illustrates an enlarged portion of a valve 500 that is implemented with another example seal assembly 502 described herein. Those components of the example valve 500 of FIG. 5 that are substantially similar or identical to those components of the example valve 300 described above and that have functions substantially similar or identical to the functions of those components will not be described in detail again below. Instead, the interested reader is referred to the above corresponding descriptions in connection with FIGS. 3 and 4. Those components that are substantially similar or identical will be referenced with the same reference numbers as those components described in connection with FIGS. 3 and 4.

The example valve 500 is substantially similar to the example valve 300 of FIGS. 3 and 4. However, a closure member 504 of the example valve 500 is implemented with a vent or passageway 506 to fluidly couple the fluid flow passageway 306 (see FIG. 3) to the seal assembly 502 via the conduits 330. The seal assembly 502 includes a first seal 508 and a second seal 510 opposite the first seal 508. A spacer ring 512 is disposed between the first and second seals 508 and 510 to prevent the first and second seals 508 and 510 from contacting each other. The first and second seals 508 and 510 are substantially similar or identical to the seals 412 and 414 of FIGS. 3 and 4 and, thus, for brevity, the description of the first and second seals 508 and 510 will not be repeated.

The passageway 506 enables pressurized fluid to flow to the seal assembly 502 between the channels 422a and 422b. The spacer ring 512 includes an aperture or opening 514 to enable the pressurized fluid to flow to a first side 516a of the spacer ring 512 opposite a second side 516b facing the passageway 506. In this manner, the passageway 506 and the opening 514 of the spacer ring 512 provides equalization of pressure across the seal assembly 502, thereby further reducing friction between the cage 314 and the first and second seals 508 and 510 when the closure member 504 moves between an open position and closed position. As a result of the reduced friction between the cage 314 and the closure member 316, the operating lives of the jackets 420a and 420b of the respective first and second seals 508 and 510 and the spacer ring 512 are substantially increased.

Although certain apparatus have been described herein, the scope of coverage of this patent is not limited thereto. To the contrary, this patent covers all apparatus fairly falling within the scope of the appended claims either literally or under the doctrine of equivalents.

What is claimed is:

1. An apparatus for use with a fluid valve, comprising:
a closure member disposed between an inlet and an outlet of a fluid flow passageway of the fluid valve, the closure member to slide relative to a cage or a valve body, wherein the closure member includes a seal gland and a passageway in fluid communication with the seal gland, the passageway to fluidly couple the seal gland and the fluid flow passageway of the fluid valve; and
a seal assembly positioned in the seal gland, the seal assembly including a first seal, a second seal opposite the first seal, and a spacer ring disposed between the first and second seals.

2. The apparatus of claim 1, wherein the first and second seals are to sealingly engage the closure member and a sealing surface of the cage or the valve body opposite the closure member.

3. The apparatus of claim 1, wherein the spacer ring includes an aperture to fluidly couple a first side of the spacer ring to a second side of the spacer ring, the second side opposite the first side.

4. The apparatus of claim 3, wherein the aperture enables equal pressurization across the seal assembly when fluid flows through the fluid flow passageway to the seal assembly.

5. The apparatus of claim 4, wherein the equal pressurization across the seal assembly reduces friction between the cage or the valve body and the first and second seals when the closure member moves between a closed position, wherein the closure member is in sealing engagement with a valve seat, and an open position, wherein the closure member moves away from the valve seat.

6. The apparatus of claim 1, wherein the closure member further includes a channel to fluidly couple the fluid flow passageway of the fluid valve to a cavity adjacent the closure member, the channel fluidly coupled to the passageway.

7. The apparatus of claim 6, wherein the channel balances pressure acting on a first side of the closure member associated with the fluid flow passageway and a second side of the closure member associated with the cavity.

8. The apparatus of claim 1, further including a retaining ring to retain the seal assembly against a shoulder of the closure member.

9. The apparatus of claim 8, further including a back-up ring disposed between the retaining ring and the seal assembly to maintain a position or orientation of the seal assembly relative to the closure member.

10. The apparatus of claim 1, wherein each of the first and second seals includes:
a jacket to contact the closure member and the cage or the valve body opposite the closure member; and
a spring to urge the jacket against the closure member and the cage or the valve body.

11. An apparatus for use with a fluid valve, comprising:
a valve plug disposed between an inlet and an outlet in a fluid flow passageway of the fluid valve, the valve plug movable relative to a valve seat to control fluid flow through the fluid flow passageway and including a channel to fluidly couple to the fluid flow passageway, wherein a passageway in the valve plug fluidly couples a seal gland to the channel when the valve plug engages the valve seat; and
a seal assembly disposed in the seal gland.

12. The apparatus of claim 11, wherein the channel is further to fluidly couple a first side of the valve plug associated with the fluid flow passageway and a second side of the valve plug associated with a cavity to equalize pressure between the first and second sides of the valve plug.

13. The apparatus of claim 11, wherein the seal assembly includes:
a first seal a second seal opposite the first seal; and
a spacer ring disposed between the first and second seals to prevent the first and second seals from contacting each other, wherein the spacer ring includes an aperture to fluidly couple a first side of the spacer ring to a second side of the spacer ring, the second side opposite the first side.

14. The apparatus of claim 13, wherein each of the first and second seals includes:
a jacket to contact the valve plug and a cage or a valve body opposite the closure member; and
a spring to bias the jacket against the valve plug and the cage or the valve body.

15. The apparatus of claim 14, further including a retaining ring to retain the seal assembly against a shoulder of the valve plug.

16. The apparatus of claim 15, further including a back-up ring disposed between the retaining ring and the seal assembly to maintain a position or orientation of the seal assembly relative to the valve plug.

17. The apparatus of claim 11, further including a valve body positioned adjacent the seal assembly opposite the valve plug, the seal assembly to prevent fluid flow between the valve plug and the valve body.

18. An apparatus for use with a fluid valve, comprising:
a closure member to slide relative to a cage or a valve body, the closure member having a seal gland adjacent a shoulder of the closure member, wherein the closure member includes a channel to fluidly couple a first side of the closure member associated with a fluid flow passageway of the fluid valve and a second side of the closure member associated with a cavity to equalize pressure between the first and second sides of the closure member; and
a seal assembly disposed on the shoulder of the closure member, the seal assembly including:
a first seal and a second seal opposite the first seal, the first and second seals to sealingly engage the closure member and the cage or the valve body opposite the closure member;
a spacer ring disposed between the first and second seals to prevent the first and second seals from contacting each other; and
a retaining ring to retain the seal assembly between the retaining ring and the shoulder of the closure member.

19. The apparatus of claim 18, further including a back-up ring disposed between the retaining ring and the seal assembly to maintain a position or orientation of the seal assembly relative to the closure member.

20. The apparatus of claim 18, wherein each of the first and second seals includes:
a jacket to contact the closure member and the cage or the valve body opposite the closure member; and
a spring to urge the jacket against the closure member and the cage or the valve body.

* * * * *